United States Patent
Marciello et al.

(10) Patent No.: US 10,546,227 B2
(45) Date of Patent: Jan. 28, 2020

(54) TPO AND PVC MEMBRANE INCORPORATING RFID TAGS

(71) Applicant: Building Materials Investment Corporation, Dallas, TX (US)

(72) Inventors: Robert John Marciello, Stewartsville, NJ (US); Daniel Podewils, Evansville, IN (US); Thomas Lee Ashby, Evansville, IN (US)

(73) Assignee: Building Materials Investment Corporation, Dallas, TX (US)

( * ) Notice: Subject to any disclaimer, the term of this patent is extended or adjusted under 35 U.S.C. 154(b) by 0 days.

(21) Appl. No.: 15/974,847

(22) Filed: May 9, 2018

(65) Prior Publication Data

US 2018/0330222 A1     Nov. 15, 2018

Related U.S. Application Data

(60) Provisional application No. 62/504,841, filed on May 11, 2017.

(51) Int. Cl.

| | |
|---|---|
| *G06K 19/077* | (2006.01) |
| *G06K 19/07* | (2006.01) |
| *B32B 27/32* | (2006.01) |
| *E04D 5/06* | (2006.01) |
| *B32B 27/30* | (2006.01) |

(52) U.S. Cl.
CPC ...... *G06K 19/07758* (2013.01); *B32B 27/304* (2013.01); *B32B 27/32* (2013.01); *E04D 5/06* (2013.01); *G06K 19/0723* (2013.01); *B32B 2419/06* (2013.01)

(58) Field of Classification Search
CPC ................................................. G06K 19/07758
USPC ........................................... 235/488; 705/28
See application file for complete search history.

(56) References Cited

U.S. PATENT DOCUMENTS

| | | | |
|---|---|---|---|
| 7,135,973 | B2 | 10/2006 | Kittel et al. |
| RE40,145 | E | 3/2008 | Leighton |
| 7,584,896 | B2 | 9/2009 | Warther |
| 7,607,583 | B2 | 10/2009 | Berardi et al. |
| 7,847,698 | B2 | 12/2010 | Rancion et al. |
| 8,094,027 | B2 | 1/2012 | Yang |
| 8,181,580 | B2 | 5/2012 | Roth et al. |
| 8,284,028 | B2 | 10/2012 | Risbo Jeppesen |
| 8,579,201 | B2 | 11/2013 | Akesson |
| 8,585,850 | B2 | 11/2013 | Muirhead |
| 8,672,232 | B2 | 3/2014 | Herslow |
| 9,135,476 | B2 | 9/2015 | Virtanen |
| 9,205,632 | B2 | 12/2015 | Aeschlimann et al. |

(Continued)

FOREIGN PATENT DOCUMENTS

| | | |
|---|---|---|
| DE | 202008010657 | 12/2009 |
| WO | 2014023980 A2 | 2/2014 |

*Primary Examiner* — Allyson N Trail
(74) *Attorney, Agent, or Firm* — Venable LLP

(57) ABSTRACT

TPO and PVC building membranes are disclosed that comprise RFID tags that are capable of storing identifying information. The RFID tags may be embedded in the membranes. By appropriate positioning of the RFID tags in the core layer of the TPO and PVC membranes, the properties of the membranes such as waterproofness and strength are not degraded by the presence of the tags and the functionality of the tags is not compromised by the manufacturing process. A method of manufacturing the membranes is also disclosed.

7 Claims, 2 Drawing Sheets

(56) References Cited

U.S. PATENT DOCUMENTS

| | | |
|---|---|---|
| 9,340,059 B2 | 5/2016 | Haas et al. |
| 9,404,581 B1 | 8/2016 | Robinson |
| 9,447,547 B2 | 9/2016 | Penland, Jr. et al. |
| 9,476,164 B2 | 10/2016 | Penland, Jr. et al. |
| 2004/0238623 A1 | 12/2004 | Asp |
| 2005/0179548 A1 | 8/2005 | Kittel et al. |
| 2008/0012687 A1 | 1/2008 | Rubinstein |
| 2010/0039226 A1* | 2/2010 | Jeppesen ............... D06N 5/00 340/10.1 |
| 2011/0006900 A1 | 1/2011 | Nyffeler et al. |
| 2013/0293355 A1* | 11/2013 | Christopher ....... G06K 7/10376 340/10.1 |
| 2014/0046810 A1 | 2/2014 | Stevens |
| 2014/0072808 A1* | 3/2014 | Peng ..................... E04D 5/10 428/422.8 |
| 2014/0305524 A1 | 10/2014 | Heizer et al. |
| 2015/0246504 A1 | 9/2015 | Liu et al. |
| 2015/0339564 A1 | 11/2015 | Herslow et al. |
| 2016/0159535 A1* | 6/2016 | Diaz ..................... B65D 41/02 705/28 |
| 2016/0259952 A1 | 9/2016 | Van Rens et al. |
| 2017/0047634 A1* | 2/2017 | Kato .................. G06K 19/077 |
| 2017/0159817 A1 | 6/2017 | Robinson |

\* cited by examiner

TPO AND PVC MEMBRANE INCORPORATING RFID TAGS

RELATED APPLICATION

This application claims priority to U.S. Provisional Application No. 62/504,841 filed on May 11, 2017, which is incorporated by reference in its entirety for all purposes within this application.

FIELD OF THE INVENTION

This invention relates to TPO and PVC building membranes that incorporate RFID tags, in particular to membranes in which RFID tags are embedded in the membranes, and to related methods of manufacture. By positioning the RFID tags in the core layer of the membranes, it has been found that the tags do not compromise the properties of the membranes and that non-specialized tags remain functional despite the elevated temperatures and dynamic forces encountered during manufacturing. By embedding the RFID tags in the membranes, the tags are protected from intentional or inadvertent removal and from environmental damage. The RFID tags can store identifying information that remains associated with a membrane throughout its lifetime and that can be read even after installation of the membrane in a structure, facilitating inspection.

BACKGROUND OF THE INVENTION

TPO (thermoplastic olefin) and PVC (polyvinyl chloride) building membranes, in particular roofing membranes, are widely used for waterproofing of structures because of their waterproofness, strength, flexibility and durability.

It would be useful to have a way to provide a membrane with identifying information (i.e., an identifier, such as a unique numeric or alphanumeric code) that remains readable throughout its lifetime. Other information about the membrane (such as its characteristics, customer information, installer, repair records etc.) could then be associated with the identifier (e.g., in a database) and accessed and updated over time, thus facilitating inspection.

Although identifying information might be printed on the outside of a membrane, it would then be at risk of unwanted alteration or removal. In order to aid inspection, it would also be beneficial to be able to read identifying information from membranes that have been incorporated into a structure and are thus invisible or difficult to access.

RFID (Radio Frequency Identification) tags are small, commercially available devices that are capable of electronically storing information and communicating by radio waves. Information can be programmed into a tag and then later read by radio wave interrogation with a suitable RFID reader. RFID tags may be attached to objects and have found various applications, particularly as means of identification. For example, U.S. Pat. Nos. RE 40,145, 7,607,583, 8,579, 201, 8,181,580, 8,585,850, 9,340,059, 9,447,547 and 9,476, 164 and U.S. Patent App. Pub Nos. 2004/0238623 and 2015/0246504 disclose various applications of RFID tags (such as in credit cards and industrial mats) and related methods of manufacture. Because of their use of radio wave communication, RFID tags, unlike written text or barcodes, can be read when not in line of sight.

Although it might in principle be possible to affix RFID tags to the outside of TPO or PVC building membranes, the tags could then be subject to unwanted removal and would be exposed to potential damage, in particular from the elements or physical impact. It would thus be desirable to embed RFID tags in the membranes. In this way the tags would be protected from removal or environmental damage, but would still be readable (by radio wave communication).

In general, TPO or PVC roofing membrane is constructed of three layers: a core layer of TPO or PVC, a polyester scrim to provide strength and structure to the sheet, and a cap layer of TPO or PVC. Weather protection is provided by the cap layer, which is thicker than the core/scrim layer and contains additives to improve weather resistance and to provide a long life. Examples of such additives are titanium oxide (to provide desired reflective properties) or anti-UV agents that extend the membrane's life on the roof.

During manufacturing, TPO & PVC roofing membranes are subject to intense heat (over 400° F.) and dynamic forces (e.g., due to passage of the membrane through calendar rollers). Such conditions have the potential to compromise the readability of non-specialized RFID tags.

U.S. Pat. No. 8,284,028 and German Patent No. DE 20200801065 disclose methods of incorporating RFID tags into bituminous roofing products. Although in these methods the RFID tags are applied to hot bitumen and thus must endure elevated temperatures, the thermal and mechanical challenges encountered during the manufacturing of TPO or PVC membrane are greater. This U.S. patent is incorporated herein by reference in its entirety for all purposes within this application.

BRIEF DESCRIPTION OF THE FIGURES

For a more complete understanding of the present invention and the advantages thereof, reference is made to the following descriptions, taken in conjunction with the accompanying figures, in which.

SUMMARY OF THE INVENTION

One embodiment of this invention pertains to a TPO or PVC building membrane that incorporates RFID tags. In a preferred embodiment the membrane is a roofing membrane. In a preferred embodiment the RFID tags are embedded in the TPO or PVC membrane. In a particularly preferred embodiment the RFID tags are located in the core layer of the membrane i.e., beneath the scrim layer. Preferably, at least one RFID tag is present in each roll of membrane.

Figure 1:
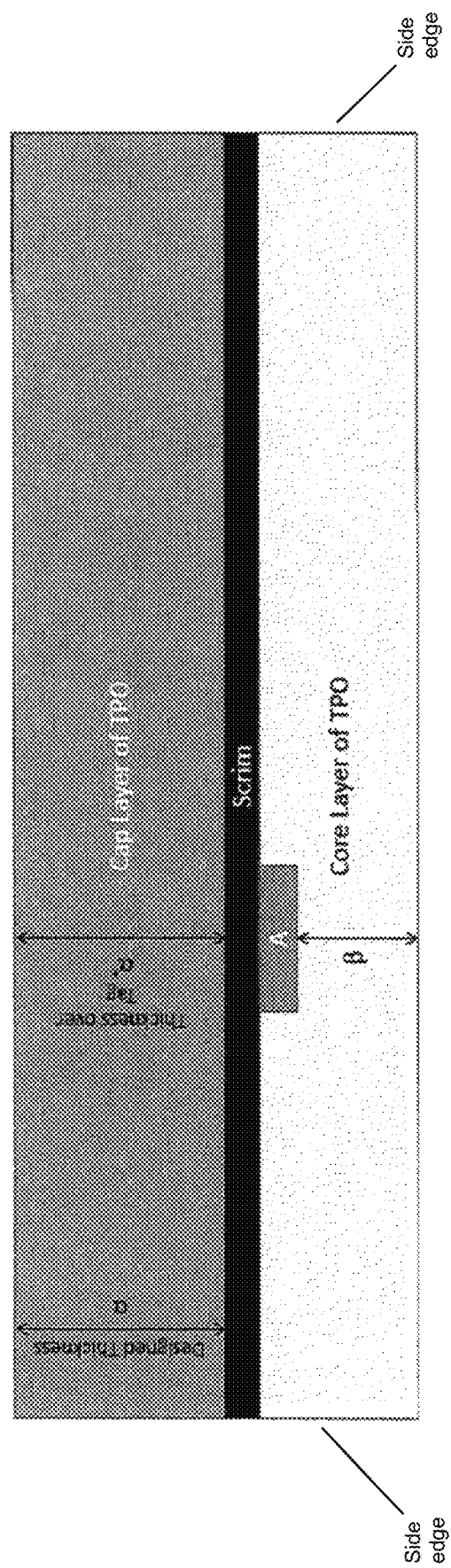
FIG. 1 is a cross-sectional view of a TPO or PVC roofing membrane in which an RFID tag is embedded in the core layer.

It has been found that by locating the RFID tags in the core layer, the roofing membrane is not significantly weakened by the presence of the tags while the tags remain protected from environmental damage or removal. Referring to FIG. 1, this is because the thickness $\alpha'$ of the cap layer over the RFID tag (A) is not reduced relative to the desired cap layer thickness $\alpha$. Moreover, non-specialized RFID tags can withstand the manufacturing process necessary to insert them into the core layer. Survival rates of over 90% of the RFID tags have been found when using the invention described herein. This is despite the fact that embedding in the core layer means that the RFID tags are exposed to the heat and dynamic forces encountered during the fabrication of both membrane layers.

Figure 2:
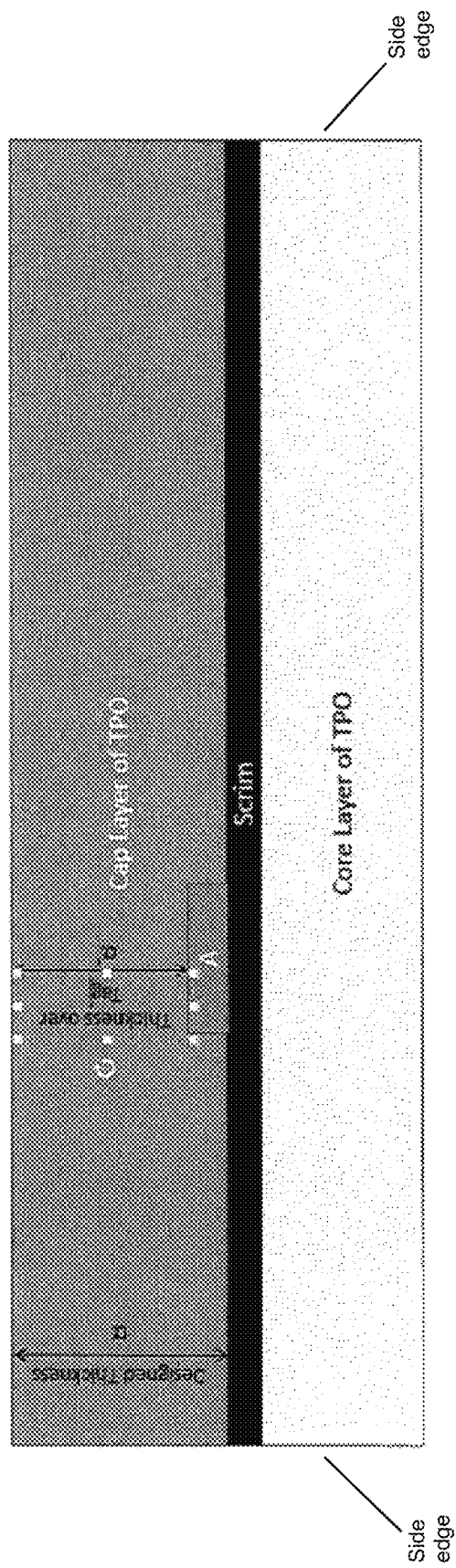
FIG. 2 is a cross-sectional view of a TPO or PVC roofing membrane in which an RFID tag is embedded in the cap layer.

If, on the other hand, the RFID tags are positioned in the cap layer, the thickness of the cap is reduced and the properties of the membrane compromised. This is because when the membrane is passed through calendar rollers during manufacturing (to ensure it is of the specified overall thickness) the cap thickness ($\alpha'$ in FIG. 2) overlaying the RFID tag (A) is reduced relative to the desired cap thickness $\alpha$ (since the tag displaces membrane material). A typical cap thickness is between about 15 mil to about 40 mil and the typical thickness of an RFID tag is about 9 mil. Hence the tag can displace between 22%-60% of the overall cap thickness. This significantly weakens the membrane and reduces its waterproofing capacity.

The RFID tags are preferably located in the membrane in such a manner as to minimize the risk of damage to the RFID tags caused by cutting of the membrane during installation. For example, the RFID tags may be positioned from about 3 inches to about 6 inches from the side edge of the membrane, or near the bottom edge where heat sealing is performed.

Methods of manufacturing TPO and/or PVC membranes are disclosed, for example, in U.S. Pat. No. 9,920,515, which is incorporated herein by reference in its entirety for all purposes within this application. For example, the core layer may be formed by extrusion of a sheet of TPO, the RFID tag(s) added as a dry inlay, the scrim disposed over the core layer, and the TPO cap layer disposed over the scrim. The layers are then laminated together at elevated temperature. Testing showed that RFID tags were able to survive the manufacturing process and remained readable.

An embedded RFID tag permits information about the properties of a membrane to be readily ascertained and updated throughout the membrane's lifetime. An RFID tag typically stores identifying information that can be read by radio wave interrogation with a suitable RFID reader. During manufacturing the identifying information stored on the corresponding RFID tag is read from the tag and entered, for example, in a database along with information about the membrane in which it is embedded. This can include, for example, date and location of manufacture and type of membrane. Later, further information about the membrane can be added to the database, such as its date of installation. Subsequently, an inspector of a structure comprising the installed membrane can read the identifying information from the embedded RFID tag and access the database to ascertain the membrane's manufacturing and installation records.

It was found that RFID tags embedded in a TPO membrane remained readable after aging for 4 weeks at 275° F. This accelerated aging test indicates that the RFID tags will retain their functionality over the lifetime of the membrane. Such RFID tags could be read at a range of up to 15 feet. Heat welding of the TPO membrane did not compromise the readability of the RFID tags.

What is claimed is:

1. A building membrane comprising one or more RFID tags,
    wherein the one or more RFID tags are embedded in a core layer of the membrane,
    wherein the membrane comprises thermoplastic olefin or polyvinyl chloride,
    wherein the membrane further comprises a scrim layer and a cap layer, and
    wherein the one or more RFID tags are positioned beneath the scrim layer.

2. The building membrane of claim 1, wherein the scrim layer is positioned between the cap layer and the core layer.

3. The building membrane of claim 1, wherein the thickness of the cap layer is between about 15 mil to about 40 mil.

4. The building membrane of claim 1, wherein the building membrane is a roofing membrane.

5. A roll of the building membrane of claim 1.

6. A method of manufacturing the building membrane of claim 1, comprising the step of passing the building membrane between calendar rollers.

7. The method of claim 6, further comprising the step of reading information from the one or more RFID tags.

* * * * *